United States Statutory Invention Registration [19]

[11] Reg. Number: H374

Abo-Zena et al. [43] Published: Nov. 3, 1987

[54] OPTIMUM MULTIPLE TARGET DETECTION AND RESOLUTION

[75] Inventors: Anas Abo-Zena, East Stroudsburg, Pa.; Eugene L. Church, Morristown, N.J.

[73] Assignee: The United States of America as represented by the Secretary of the Army, Washington, D.C.

[21] Appl. No.: 19,711

[22] Filed: Feb. 9, 1987

[51] Int. Cl.[4] ..... G01S 3/16

[52] U.S. Cl. ..... 342/378

*Primary Examiner*—Stephen C. Buczinski
*Assistant Examiner*—Linda J. Wallace
*Attorney, Agent, or Firm*—Anthony T. Lane; Harold H. Card, Jr.; Michael C. Sachs

[57] ABSTRACT

A method or technique of resolving multiple energy sources from signals obtained by a spatial array of sensors in which portions of two prior art techniques are combined to yield an improved hybrid technique. The method involves sampling and digitizing the output of a sensor array, forming and storing a co-variance matrix from such digitized samples, determining the eigenvectors and corresponding eigenvalues relating to said matrix, performing a directional eigenanalysis on the data of the matrix and determining the minima of the resulting curves, then using a minimum variance method to calculate from said matrix data the total power at each steering direction corresponding to each of said minima, then thresholding the calculated total powers to eliminate false alarms and yield the direction of each power source.

6 Claims, 1 Drawing Figure

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

OPTIMUM MULTIPLE TARGET DETECTION AND RESOLUTION

The invention described herein may be manufactured, used and licensed by or for the Government for governmental purposes without the payment to us of any royalties thereon.

BACKGROUND OF THE INVENTION

The invention relates to the detection and resolution of multiple targets (or energy sources) from signals obtained by a spatial array of sensors. The invention has wide application in such diverse fields as passive sonar, in which case the sensors would be acoustic and the targets might be hostile submarines, earthquake and nuclear weapon detonation detection systems, in which case the sensors would be seismic and the targets the earthquake or explosion epicenters, astronomical interferometry wherein the sensors would be radiotelescopes and the targets may be distant galaxies or quasars, and phased-array radars in which case the sensors would be the array antennae. More particularly, the invention is intended to be used for precision target detection of enemy targets to enable a strike on said enemies to be commanded electronically by a battlefield command control center.

When a signal is known to consist of pure sinusoids in white noise, an appropriate procedure for determining the unknown frequencies and powers is the Pisarenko spectral-decomposition described in his paper entitled "The Retrieval of Harmonics from a Co-Variance Function", Geophysical Journal of the Royal Astronomical Society, Vol. 33, pp 347–366, 1973. All that is needed is a finite segment of the discrete covariance function whose length is at least one more than the number of sinusoids to be determined. The method is based on eigenanalysis of a Toeplitz matrix produced from the covariance function.

When Pisarenko extended this method to signals where the amplitudes and the frequencies have small random perturbations around central values he showed that linear approximation is justified when the number of sinusoids is one less than the number of eigenvectors. However, when a larger segment of the covariance function was used, leading to a larger number of eigenvectors, the statistical analysis was much more difficult. These extra eigenvectors also produced false sinusoids which appeared at fictitious frequencies with fictitious amplitudes. As a result he recommended disregarding the extra covariance data.

Since then the extension of the Pisarenko method to the problem of extracting multiple-target information from array data has led to many different techniques, e.g., the Eigen-Vector Method EVM, of Johnson and Degraff, see IEEE trans. on ASSP, Vol. 30, pp 638–647, August 1982 and the Multiple-Signal-Classification scheme (MUSIC) of Schmidt, see Proceedings RADC Sprectral Estimation Workshop, Rome, N.Y., pp. 243–258, October 1979. Between the desire to use all the available information and the problem of coping with false alarms, investigators adopted the concept of artificially dividing the eigenspace of the signal covariance matrix into two subspaces, (1) the source space, consisting of eigenvectors with large eigenvalues, and (2) noise space, consisting of the remaining eigenvectors. In these approaches the distinction between the two spaces requires a subjective judgment (or guess) on the dividing line between the sets of eigenvalues. In any case, it must be recognized that any such distinction is artificial since the noise occupies all of the eigenspace, and each eigenvector may have contributions from any source.

In these prior art procedures a metric is then formed from the so-called noise space to measure its deviation from orthogonality to the true source space. The inverse of this metric is then used to indicate the directions of arrival and the powers of the various sources. The effect of using several eigenvectors in the metric tends to decrease the number of false alarms and to produce an average location for each source. Each investigator pursuing this approach used some kind of metric, but none of them proved that the resulting procedures led to "optimum" target resolution in any sense. The present invention comprises a different approach which while based on the Pisarenko method, differs from the earlier ad hoc approaches and yields demonstrably better multi-target resolution.

SUMMARY OF THE INVENTION

The method of the present invention is a hybrid one comprising portions of two prior art techniques which when combined in the manner taught herein produces results which are superior to any prior art technique.

The concept of the present novel method of resolving multiple energy sources from received sensor array data comprises the full exploitation of the orthogonality properties of the eigenvector system, which is obtained by finding the lowest or minima of the projections of the energy sources plus noise on the eigensystem as a steering vector is scanned over the field of view. This portion of the novel method indicates the location of both true energy sources and false alarms. In accordance with the invention, the false alarms can be easily eliminated by thresholding the power at each of the candidate source locations using a known minimum variance method, such as the maximum likelihood method (MLM) of Capon, cited below, herein. The present method provides optimum source power as well as optimum source location(or resolution).

The method of the present invention comprises the steps of: forming an estimate of the covariance matrix from digitized samples (or snapshots) of the outputs of an array of sensors, performing an epgenanalysis of this matrix, determining the amount of projected energy on each eigenvector through a steering vector as that vector is steered in different directions from which target signals may come, determining the minima of said projected energy to form a set of candidate target directions which comprise true target sources as well as false alarms, then determining the total powers received from each of said candidate directions using a minimum variance method, and finally then thresholding the said power levels to eliminate the false alarms.

Another object of the invention is to provide increased resolution in the detection of targets received by a spaced array of sensors by utilizing steps from two prior art methods or techniques to form a new and improved method or technique, and wherein the novel technique of the invention does not involve dividing the signal space into noise space and source space, but involves performing an eigenanalysis on the energy contributions from all sources as well as noise associated with its eigenvector.

These and other advantages and objects of the invention will become apparent from the following detailed description and the drawings.

DETAILED DESCRIPTION OF A PREFERRED EMBODIMENT

Figure 1:
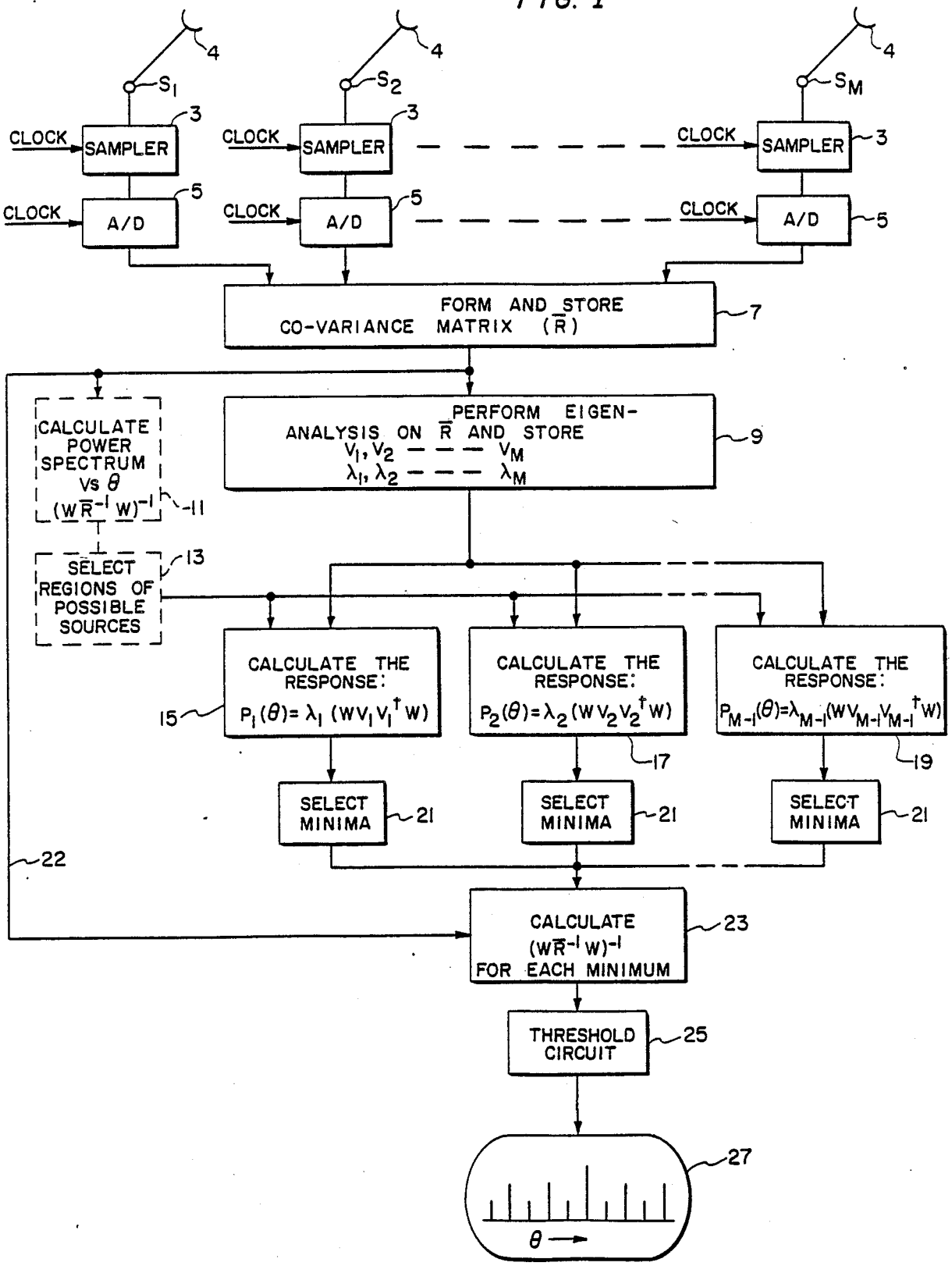
FIG. 1 is a block diagram of circuitry which may be used to carry out the method of the invention.

Prior to 1969 it was commonly thought that two targets could not be resolved if the angular separation thereof were less than the beamwidth of the array of sensors. The technique used was the classical Beamformer method.

Conventional linear processing, or Beamforming, uses the response function;

$$P(\theta) = W^t R W = W^t \left[ \sum_{i=1}^{M} \lambda_i V_i V_i^t \right] W \tag{1}$$

wherein W is the steering vector corresponding to the direction $\theta$, R is the covariance matrix of the M-element sensor array. The right hand expression represents R written in its eigenvalue expansion wherein the λ's are the eigenvalues and the V's are the eigenvectors. The superscript t indicates a conjugate transpose. Although this conventional estimator is asymtotically efficient for a single, plane wave target in white noise, its resolving power for multiple targets is limited to the received signal wavelength divided by the array maximum spatial dimension.

In 1969 Capon published his minimum variance or maximum liklihood method (MLM) in the Proceedings of the IEEE, Vol. 57, pp 1408–1418, August '69. This method uses the response;

$$P(\theta) = (W^t R^{-1} W)^{-1} = \left( W^t \left[ \sum_{i=1}^{M} \lambda_i^{-1} V_i V_i^t \right] W \right)^{-1} \tag{2}$$

This is a non-linear estimator which permits better resolution of multiple targets than that permitted by the linear response function of Equation (1).

The Johnson and De Graff (EVM) technique uses the following response;

$$P(\theta) = \left( W^t \left[ \sum_{i=1}^{k} \lambda_i^{-1} V_i V_i^{-1} \right] W \right)^{-1} \tag{3}$$

Wherein k=M minus the estimated number of targets.

The MUSIC technique of Schmidt uses;

$$P(\theta) = \left( W^t \left[ \sum_{i=1}^{k} V_i V_i^t \right] W \right)^{-1} \tag{4}$$

Wherein k has the same meaning as in Equation (3).

The aforementioned techniques, EVM and MUSIC, both are based on artificially dividing the signal space into source space and noise space wherein the noise space yields an average location of the sources if the signal to noise ratio is high enough and/or the source separation is wide enough. As a result these techniques are inadequate for many practical cases of interest.

For any sensor array the measured data can be represented as the column vector;

$$X(t) = [X_1(t), X_2(t), \ldots X_k(t)]^t \tag{5}$$

wherein t is time and t denotes the conjugate transpose. The cross correlation matrix of these data is;

$$R = E[X \cdot X^t] \tag{6}$$

wheren E here is the expectation. The eigenvectors, V, of R and their corresponding eigenvalues, λ, are defined by;

$$R V_k = \lambda_k V_k \tag{7}$$

Eigenanalysis is a tool for giving us an orthogonal set of coordinates wherein the variance of the data is lowest on one axis and highest on another. These axes are the principal components.

If we now pre-multiply by $V^t$and take $V^t V = 1$ we find;

$$V_k^t R V_k = E[V_k^t X \cdot X^t V_k] = \lambda_k \tag{8}$$

which means that the variance of the projected data on a given eigenvector equals its eigenvalue. These eigenvalues can represent energy or power depending on the inuts of the data. The total energy in the system is;

$$\sum_{k=1}^{M} \lambda_k \tag{9}$$

That component of the total energy which can be projected onto any given eigenvector is its particular eigenvalue. On the other hand, the energy projected on an eigenvector V through the steering vector W is;

$$\phi_k(\theta) = \lambda_k (W^t V_k V_k^t W) \tag{10}$$

As W is steered in different directions this projection will pass through various peaks and valleys, or maxima and minima. Peaks indicate that V is near that steering direction containing a high level of received energy from a unique (single) source or possibly from an unresolved set of sources. Valleys or minima on the other hand indicate that V is nearly orthogonal to that direction of a source represented by the steering vector, or to some interference between sources.

How does one use these properties to estimate the target directions. The first guess might be to use the locations of the peaks or maxima of Equation (10), however that approach gives only slight improvement over the classical Beamformer, which looks for the maxima of the quantity;

$$W^t \bar{R} W = \sum_{k=1}^{M} \phi_k(\theta) \tag{11}$$

An alternate approach, which is the subject of this invention, involves performing an eigenanalysis on a covariance matrix derived from sampled and digitized snapshots of the outputs of the sensors of the array to obtain the function of Equation (10) which represents energy projected on an eigenvector through the steering vector, and hence will yield a curve of energy (or power) vs. steering angle or azimuth, the angle being related to the array geometry. The minima of this curve are selected and, as stated above, these minima represent candidate target directions which may include unresolved multiple targets and/or false alarms. Thresholding of the energy (or power) of these candidate target directions is then performed by means of a known minimum variance method, such as Capon's maximum likelihood method. This results in elimination of the false alarms.

The block diagram of FIG. 1 is a combination of a circuit diagram and a flow chart which illustrates one way in which the method can be practiced. This FIGURE includes a plurality of sensors, $S_1$, $S_2$, . . . $S_M$, linearly aligned. The use of a linear array is illustrative only since the method is applicable to any array geometry. This is important since many competing methods require linear arrays of sensors. The sensors may be connected to antennas 5. The sensors will have electrical outputs which will vary with the variations in energy incident thereon from discrete remote targets, from remote noise sources, and from any noise generated in the sensors or their amplifiers. The output of each of the sensors is applied to a sampler circuit 3 which measures and passes the instantaneous sensor voltage to an analog-to-digital converter 5. The system clock triggers the sampler and the A/D converters 5 so that for each clock pulse a snapshot comprising samples of all sensor outputs at a given time are obtained. The clocks of all the samplers and A/D converters must be synchronized so that the snapshots are internally coherent. The binary coded digital numbers obtained from the A/D converters are suitable for processing by digital computers and all of the subsequent steps can be performed by one or more computers, suitably programmed. A predetermined number of snapshots or sets of samples are obtained in this way and the samples are mathematically processed in block 7 to form a co-variance matrix, $\overline{R}$. The bar over the matrix symbol $\overline{R}$ indicates that it is a matrix formed by averaging a number of sets of samples obtained by means of the illustrated circuitry. For example, one hundred snapshots may be taken and the samples averaged and then processed into the co-variance matrix. The co-variance matrix is a Hermitian matrix of order M, wherein M is the number of sensors. The elements of the matrix are the products of pairs of digitized sensor samples. A matrix of this type is known as an outer product, zero lag cross-correlation matrix. The elements of the matrix $\overline{R}$ would normally be stored in an MxM array of addresses in the computer memory, so that the elements thereof can be easily retrieved for subsequent steps in this method.

The next step in the method, indicated by block 9, involves electronically performing an eigenanalysis on $\overline{R}$ to calculate the eigenvectors and their associated eigenvalues corresponding to the matrix $\overline{R}$. For an MxM matrix there will be M eigenvectors, $V_1$, $V_2$, . . . $V_M$ and a like number of eigenvalues, $\lambda_1$, $\lambda_2$, . . . $\lambda_M$. Each eigenvector represents an axis or direction, relative to the matrix, wherein the variance of the data is highest and wherein the data variance orthogonal to the vector is lowest. The calculated eigenvectors and eigenvalues are stored in memory for the subsequent directional eigenanalysis indicated by blocks 15, 17, and 19. The dashed-line blocks 11 and 13 indicate an optional step or steps in which likely target directions are selected by using a prior art minimum variance method as Capon's aforementioned method. This optional step saves computer time by greatly reducing the amount of directional eigenanalysis which would otherwise have to be performed for large sectors of steering angles, e.g., 180°. In optional step 11 the power spectrum vs. $\theta$ (steering direction) is electronically calculated using Capon's formula, $(WR^{-1}W)^{-1}$, utilizing the co-variance matrix R previously derived. The result of the calculation indicated by block 11 will be a curve of power vs. $\theta$, and the peaks or maxima thereof will indicate possible target sources or unresolved groups of sources. Steering directions in the vicinity of these peaks can be selected by thresholding the power curve obtained from the step of block 11. The thresholding step which results in this selection of likely steering directions to be investigated by the subsequent directional eigenanalysis is indicated by block 13. The output of block 13 is fed to each of the blocks 15, 17 and 19 so that the directional eigenanalysis is limited to the aforementioned steering directions which are regions of possible sources.

The directional eigenanalysis involves determining the amount of energy (or power) projected on each eigenvector through a steering vector as the steering vector is scanned over a field of view. The steering vectors are related to the sensor array geometry. The directional eigenanalysis performed by block 15 involves calculating the response, $P_1(\theta)=\lambda_1(WV_1V_1^tW)$, *wherein* $P_1(\theta)$ indicates power projected on the eigenvector $V_1$ by the steering vector W as W is scanned over the angles $\theta$. The block 17 represents the same directional eigenanalysis performed for eigenvector $V_2$. The number of these analyses performed is one less than the number of sensors and eigenvectors, M. Thus block 19 performs the eigenanalysis on the eigenvector $V_{m-1}$. The eigenanalysis of vector $V_M$ is omitted because $\lambda_M$ is large and is therefore associated with large energy values do not contribute to the minima being sought. The calculations by blocks 15, 17 and 19 may be performed sequentially by the same computer, utilizing the eigenvectors and eigenvalues calculated by the step of block 9 and the steering directions indicated by the selection step of block 13. If extreme speed is essential, separate computers could be used to perform each of the directional eigenanalyses.

Each of the directional eigenanalysis steps of blocks 15, 17 and 19 will result in separate curves of power vs. steering direction. As stated above, in the prior art, the maxima of these curves were considered as sources or power for the eigenvectors corresponding to large eigenvalues, the smaller eigenvalues having been considered to be the result of noise. One problem with this approach was the fact that these maxima or peaks of the power spectra curves could indicate two or more closely spaced and unresolved sources. However, two closely spaced sources which indicate a single maxima when the steering vector is aligned with the eigenvector can produce separate resolvable minima, each of which is orthogonal to its source. These minima are obtained when the steering vector is pointing toward the source and is thus orthogonal to the eigenvector. For this reason, the minima or valleys of the power spectrum vs. steering direction of all of the directional eigenanalyses are selected for further processing as candidate targets. It is possible that some of these minima represent false alarms, For example, a minimum may result from mathematical cancellation and not from an energy source. Such false alarms can be elimanated by determining by means of a prior art technique such as Capon's aforementioned minimum variance method, the total power or energy at each of the directions corresponding to each of the minima resulting from the eigenanalysis steps, and thresholding the results to eliminate false alarms. These final steps are indicated by blocks 23 and 25. The blocks 21 each provide block 23 with one or more minima resulting from the separate eigenanalysis calculations indicated by blocks 15, 17 and 19. The power spectrum calculations, using the relation $P(\theta)=(WRW)^{-1}$, are performed using the data of the matrix of block 7 applied to block 23 via line 22. The threshold circuit 25 simply eliminates any power reading below the selected threshold amplitude, which could be made variable to accommodate different situations. The thresholded targets are shown on display 27 wherein the horizontal axis may indicate the steering direction and the vertical lines, the relative strength of discrete targets. It should be noted that the steering directions, $\theta$, represent the steering vectors, W, referred to the array geometry. The thresholded targets are also utilized conceptually by command control circuitry 28 to command a strike (signal 29) upon an enemy target by conventional weaponry which utilizes these values to steer a strike upon such enemy targets.

The method of the present invention was compared to several prior art methods by means of computer simulations. The simulation comprised two plane-wave target sources incident on a linear array of ten sensors. One hundred snapshots were used to generate the estimated co-variance matrix for each target configuration. The noise at each sensor was independent white Gaussian noise with unit variance. Computer simulations were run wherein the present invention is compared with the following methods; The Maximum Likelihood Method (MLM) of Capon, the Eigen Vector Method (EVM) of Johnson and DeGraaf, and the Multiple Signal Classification Method (MUSIC) of Schmidt. The data of these runs represent the average of five realizations and therefore carry information about the variance of the methods as well as their ensemble performance.

The predicted locations of two equal-amplitude sources (A1=A2) at fixed locations, U1=1.0 and U2=0.9, as a function of their common signal-to-noise ratio (SNR), wherein $U=2\pi d/1\cdot\sin\theta$, where d is the spacing between sensors and 1 is the wavelength of the incoming energy. The present method exhibits about 8 db advantage over the MUSIC and EVM methods, and about 20 db over the MLM method.

The predicted locations of two equal-amplitude sources A1=A2=10, i.e., the SNR=20 db, as a function of their separation U1-U2. U1 can be kept fixed while U2 can be made to vary between 1.0 and 0.6. Under these conditions the present method distinguishes the sources at less than half the threshold separation of MUSIC or the EVM methods, and less than one quarter that of the MLM method.

The predicted location of two fixed sources, U1−1.0 and U2=0.9, are a function of their amplitude ratio A1/A2. If A2 is held constant at A2=100 (SNR=40 db) while A1 is varied, the present method is superior to the MUSIC and EVM methods by more than 10 db and more than 20 db relative to the MLM method.

While the invention has been described in connection with illustrative embodiments, obvious variations therein will be apparent to those skilled in the art.

What is claimed is:

1. A method of detecting and resolving multiple enemy energy sources from signals obtained from a spatial array of sensors, said method implementing the steps of: sampling and digitizing the outputs of said array of sensors a plurality of times, forming and storing a co-variance matrix from the said sampled and digitized outputs of said sensors, wherein the value of the elements of said co-variance matrix are the respective products of multiplying the values of each possible pair of digitized outputs of said sensors, to form an outer product, zero lag, cross correlation, Hermitian, covariance matrix, determining the eigenvectors and corresponding eigenvalues relating to said matrix, performing a directional eigenanalysis on the data of said matrix to determine curves of energy projected on said eigenvectors by a steering vector as said steering vector is scanned over a field of view, determining the minima of each of said curves and then using a minimum variance method to calculate from said matrix data the total power at each steering direction corresponding to each said minimum, and then thresholding the calculated total powers to eliminate false alarms and yield the angular direction of each power source relative to the geometry of said array and the relative strengths of powers of each said source.

2. The method of claim 1 wherein the number of sensors is M and the said directional eigenanalysis is performed for all eigenvectors up to and including the $V_{M-1}$ eigenvector, and wherein the said minimum variance method is the Maximum Likelihood Method of Capon.

3. The method of claim 1 wherein prior to the directional eigenanalysis step a power spectrum curve vs. steering direction ($\theta$) is derived for the said matrix (R) using the relation $P(\theta)=(E\bar{R}E)^{-1}$, and the regions thereof in the vicinity of the maxima of said curve are selected and the subsequent directional eigenanalysis is limited to the said regions.

4. A method of detecting and resolving multiple enemy energy sources received by a spatial array of sensors, said method implementing the steps of: forming a co-variance matrix (R) from the digitized samples of the signals received by said sensors, wherein the value of the elements of said co-variance matrix are the respective products of multiplying the values of each possible pair of digitized outputs of the said outputs of said sensors, to from an outer product, zero lag, cross-correlation, Hermitian, co-variance matrix, finding the minima of the projections of the said energy sources plus noise on the eigensystem corresponding to said co-variance matrix as a steering vector is scanned over a field of view, then calculating the total power at each steering direction corresponding to each of said minima using a minimum variance method, and then thresholding the calculated total powers to yield the steering directions and relative powers of the said multiple energy sources.

5. A method of detecting and resolving multiple enemy energy sources received by a spatial array of sensors, said method implementing the steps of: forming a co-variance matrix from digitized samples of the outputs of said sensors, wherein the value of the elements of said co-variance matrix are the respective products of multiplying the values of each possible pair of digitized outputs of the said outputs of said sensors, to form an outer product, zero lag, cross-correlation, Hermitian, co-variance matrix, determining a set of candidate target directions based on the locations of the minima of the total energy projected on the eigensystem corresponding to said co-variance matrix as a steering vector is scanned over a field of view, then determining the total power at each of said candidate target directions utilizing the Maximum Likelihood Method of Capon and then thresholding the total powers so obtained to eliminate false alarms.

6. A method of detecting and resolving multiple enemy energy sources from signals obtained from a spatial array of M sensors said method implementing the steps of: sampling and digitizing the outputs of said array of sensors, forming and storing a co-variance matrix form the said sampled and digitized outputs of said sensors, wherein the value of the elements of said co-variance matrix are the respective products of multiplying the values of each possible pair of digitized outputs of the said outputs of said sensors, to form an outer product, zero lag, cross-correlation, Hermitian, co-variance matrix, determining the eigenvector $V_n$, and the corresponding eigenvalues, $\lambda_n$ relating to said co-variance matrix, performing a directional eigenanalysis to calculate the minima of the response, $P_n(\theta)=\lambda_n(WV_nV_n^tW)$ for $n=1$ through $n=M-1$ to determine said minima of $M-1$ curves of energy projected on said eigenvectors by the steering vector W as said steering vector is scanned over a field of view, and then using a minimum variance method to calculate from said matrix data the total power at each steering direction corresponding to each of said minima, and then thresholding the calculated total powers to eliminate false alarms and yield the angular direction of each power source relative to the geometry of said array and the relative strengths or power of each said source.

* * * * *